(12) United States Patent
Shirakawa et al.

(10) Patent No.: US 12,298,154 B2
(45) Date of Patent: May 13, 2025

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP); Yukio Ikeda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 273 days.

(21) Appl. No.: 18/107,184

(22) Filed: Feb. 8, 2023

(65) Prior Publication Data
US 2023/0251112 A1    Aug. 10, 2023

(30) Foreign Application Priority Data

Jan. 10, 2023   (JP) .................................. 2023-00173

(51) Int. Cl.
*G01D 5/20*    (2006.01)
*B62D 15/02*   (2006.01)

(52) U.S. Cl.
CPC ......... *G01D 5/204* (2013.01); *B62D 15/0225* (2013.01)

(58) Field of Classification Search
CPC ... G01D 5/204; G01D 5/2053; B62D 15/0225
See application file for complete search history.

(56) References Cited

U.S. PATENT DOCUMENTS

| 9,828,021 | B2* | 11/2017 | Ueno | B62D 5/0481 |
| 2006/0075840 | A1* | 4/2006 | Saito | B62D 3/12 |
| | | | | 74/422 |
| 2007/0080016 | A1* | 4/2007 | Onizuka | B62D 5/0409 |
| | | | | 180/444 |
| 2008/0042389 | A1* | 2/2008 | Mizuno | B62D 5/0463 |
| | | | | 280/93.514 |
| 2021/0309284 | A1* | 10/2021 | Ishii | F16C 29/02 |

FOREIGN PATENT DOCUMENTS

WO    WO 2021/210125 A1    10/2021

* cited by examiner

*Primary Examiner* — Alvaro E Fortich
(74) *Attorney, Agent, or Firm* — MCGINN I.P. LAW GROUP, PLLC

(57) ABSTRACT

A position detection device for detecting a position of a shaft moving forward and backward in an axial direction is provided with a detection object attached to the shaft, an excitation coil for generating an alternating magnetic field, and a detection coil arranged along an axial direction of the shaft. A magnitude of a voltage induced in the detection coil varies in accordance with a position of the detection object.

14 Claims, 12 Drawing Sheets

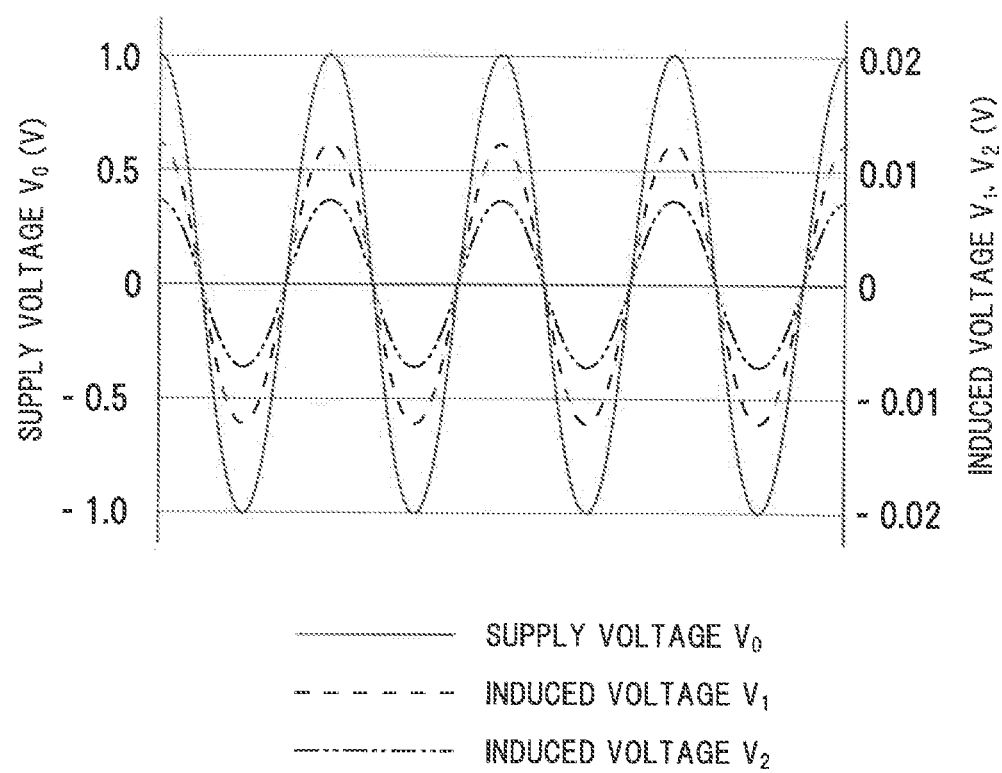

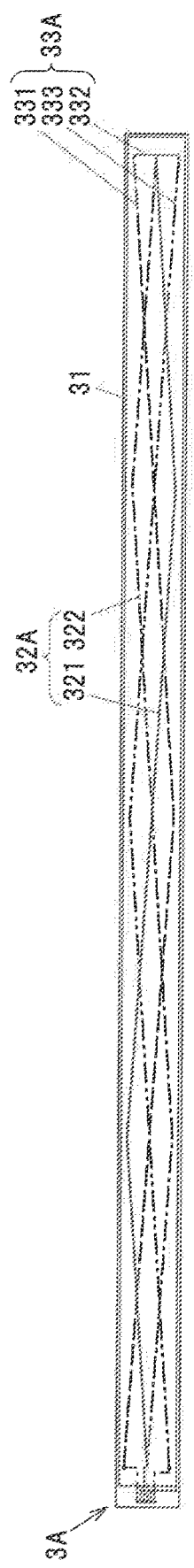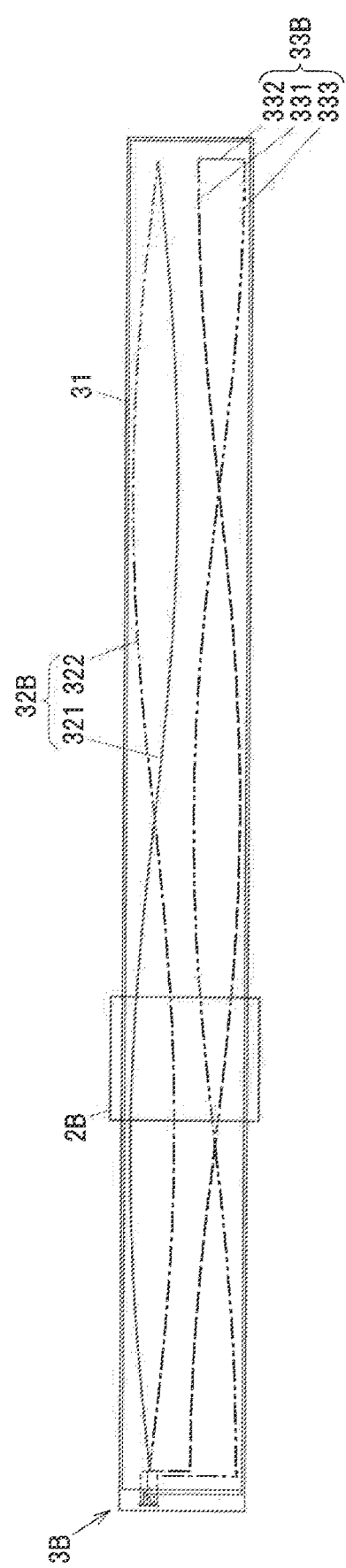

POSITION DETECTION DEVICE

CROSS-REFERENCE TO RELATED APPLICATIONS

The present patent application claims the priority of Japanese patent application No. 2022-019510 filed on Feb. 10, 2022, and the priority of Japanese patent application No. 2023-001735 filed on Jan. 10, 2023, and the entire contents thereof are hereby incorporated by reference.

TECHNICAL FIELD

The present invention relates to a position detection device that detects the position of a shaft that moves forward and backward in an axial direction.

BACKGROUND OF THE INVENTION

Conventionally, a position detection device that detects the position of a shaft that moves forward and backward in an axial direction is being used, for example, to detect the position of a rack shaft in a steering device of a vehicle.

A detection unit described in Patent Literature 1 detects an axial position of a rack shaft of an electric power steering device, and includes a DC power source, a permanent magnet, an element group composed of first to fourth magnetoresistive elements disposed between the permanent magnet and the rack shaft, and a computing section for calculating a position of the rack shaft. In the element group, a series circuit including the first and second magnetoresistive elements being connected in series and a series circuit including the third and fourth magnetoresistive elements being connected in series are connected in parallel to form a bridge circuit. To the computing section, a potential of a first terminal connected between the first magnetoresistive element and the second magnetoresistive element, and a potential of a terminal connected between the third magnetoresistive element and the fourth magnetoresistive element are input. Plural grooves extending in a direction inclined with respect to the axial direction of the rack shaft are formed on the surface of the rack shaft facing the element group.

In the detection unit configured as described above, when the rack shaft moves in the axial direction due to rotation of a pinion gear shaft meshing with the rack shaft and the relative positions of the first to fourth magnetoresistive elements with respect to the grooves change, electric resistance balance of the first to fourth magnetoresistive elements changes, so that the potentials of the first terminal and the second terminal change. The computing section calculates the position of the rack shaft based on changes in these potentials.

Citation List Patent Literature 1: WO2021/210125

SUMMARY OF THE INVENTION

In the detection unit described in Patent Literature 1, when the rack shaft moves in a forward and backward direction of a vehicle (i.e., vehicle longitudinal direction) with respect to the detection unit due to, for example, vibration caused by running of the vehicle, the relative positions of the first to fourth magnetoresistive elements with respect to the grooves change, and an error will occur in the detected position of the rack shaft. Also, when the rotation direction of the pinion gear shaft changes, if the rack shaft rotates slightly around its central axis due to a change in tooth contact between the pinion gear shaft and the rack shaft, an error will occur in the detected position of the rack shaft. In particular, if an attempt is made to detect the absolute position of the rack shaft in the axial direction over the entire stroke range using the detection unit disclosed in Patent Literature 1, the inclination angle of the grooves with respect to the axial direction must be shallow, so that large errors are likely to occur in the detection results.

Accordingly, it is an object of the present invention to provide a position detection device capable of detecting the position of a shaft moving forward and backward in the axial direction with high accuracy.

For the purpose of solving the aforementioned problem, one aspect of the present invention provides a position detection device for detecting a position of a shaft moving forward and backward in an axial direction, comprises:
 a detection object attached to the shaft;
 an excitation coil for generating an alternating magnetic field; and
 a detection coil arranged along an axial direction of the shaft,
 wherein a magnitude of a voltage induced in the detection coil varies in accordance with a position of the detection object.

Advantageous Effects of the Invention

According to the present invention, it is possible to provide a position detection device capable of detecting the position of a shaft moving forward and backward in the axial direction with high accuracy.

BRIEF DESCRIPTION OF DRAWINGS

FIG. 6 is a graph showing a relationship between a supply voltage supplied from a power supply to an excitation coil and an induced voltage induced in a sine waveform detection coil as well as an induced voltage induced in a cosine waveform detection coil.

FIG. 10 is a plan view showing a substrate according to a first modified example.

FIG. 11 is a plan view showing a substrate and a target according to a second modified example.

DETAILED DESCRIPTION OF THE INVENTION

Embodiments

Figure 1A:
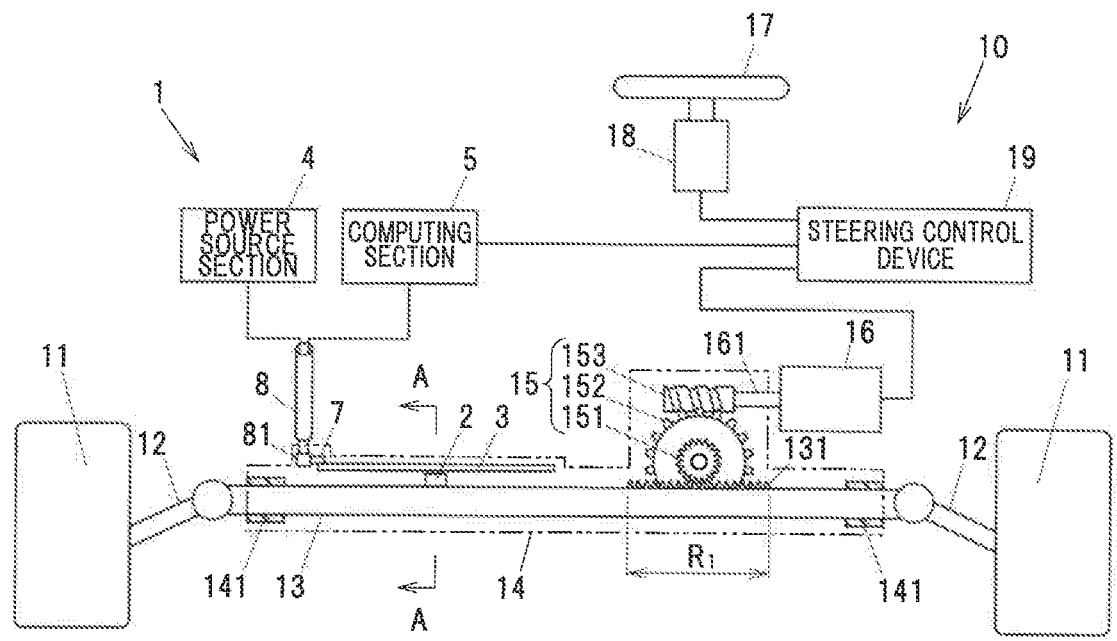
FIG. 1A is a schematic diagram of a vehicle equipped with a steer-by-wire steering device having a stroke sensor as a position detection device according to an embodiment of the present invention.
Figure 1B:
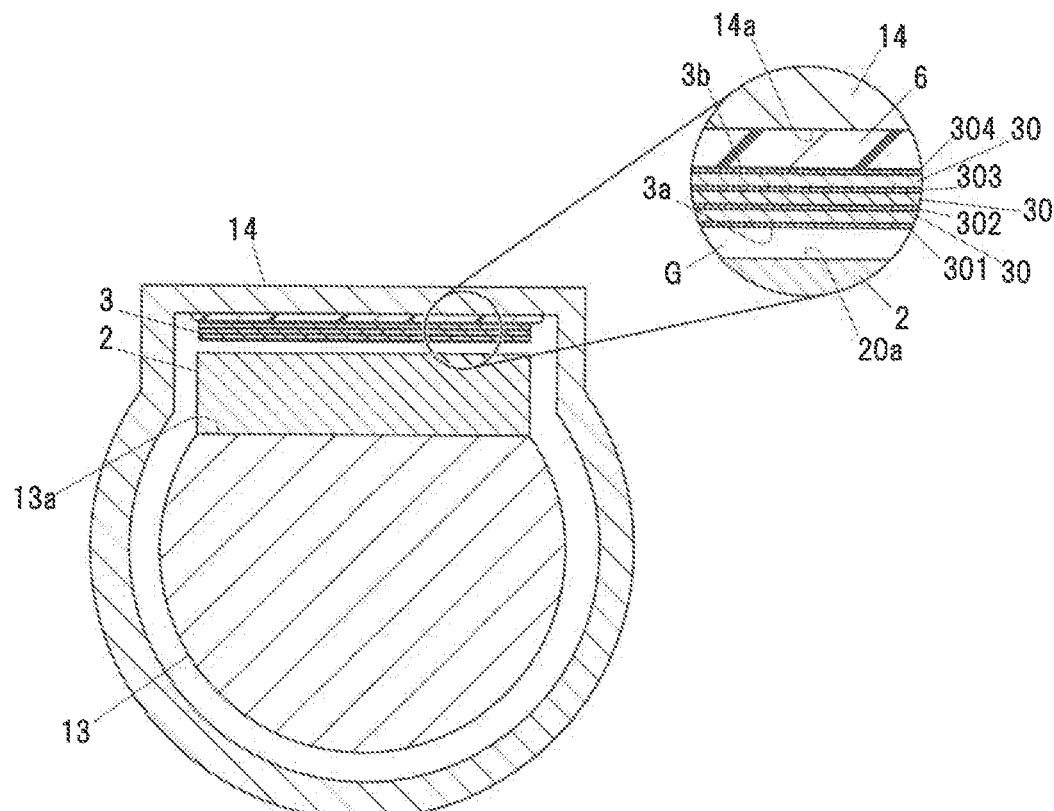
FIG. 1B is a cross-sectional view taken along a line A-A of FIG. 1A.

FIG. 1A is a schematic diagram of a vehicle equipped with a steer-by-wire steering device 10 having a stroke sensor 1 as a position detection device according to an embodiment of the present invention. FIG. 1B is a cross-sectional view taken along a line A-A of FIG. 1A.

As shown in FIG. 1A, the steering device 10 includes a stroke sensor 1, a tie rod 12 connected to steering wheels (left and right front wheels) 11, a rack shaft 13 connected to the tie rod 12, a tubular housing 14 for housing the rack shaft 13, a worm reduction mechanism 15 having a pinion gear 151 meshed with a rack teeth 131 of the rack shaft 13, an electric motor 16 for applying an axial movement force to the rack shaft 13 through the worm reduction mechanism 15, a steering wheel 17 that is steered by a driver, a steering angle sensor 18 that detects an steering angle of the steering wheel 17, and a steering control device 19 that controls the electric motor 16 based on the steering angle detected by the steering angle sensor 18.

In FIG. 1A, the housing 14 is indicated by virtual lines. The rack shaft 13 is made of steel such as carbon steel, and is supported by a pair of rack bushings 141 attached to both ends of the housing 14. The worm reduction mechanism 15 has a worm wheel 152 and a worm gear 153, and a pinion gear 151 is fixed to the worm wheel 152. The worm gear 153 is fixed to a motor shaft 161 of the electric motor 16.

The electric motor 16 generates torque by a motor current supplied from the steering control device 19 and rotates the worm wheel 152 and the pinion gear 151 via the worm gear 153. When the pinion gear 151 rotates, the rack shaft 13 moves forward and backward in its axial direction, and the left and right steering wheels 11 are steered. The rack shaft 13 can move rightward and leftward in a vehicle widthwise direction within a predetermined range from a neutral position when the steering angle is zero (0). In FIG. 1A, a range $R_1$ in which the rack shaft 13 can move in the axial direction is indicated by a double arrow.

Structure of Stroke Sensor 1

The stroke sensor 1 includes a target 2 attached to a rack shaft 13, a substrate 3 disposed to face the target 2, a power source section 4, and a computing section 5. The substrate 3 is fixed within the housing 14. The stroke sensor 1 detects the position of the rack shaft 13 with respect to the housing 14 based on the position of the target 2 and outputs information on the detected position to the steering control device 19. The steering control device 19 controls the electric motor 16 in such a manner that the position of the rack shaft 13 detected by the stroke sensor 1 corresponds to the steering angle of the steering wheel 17 detected by the steering angle sensor 18.

Figure 2:
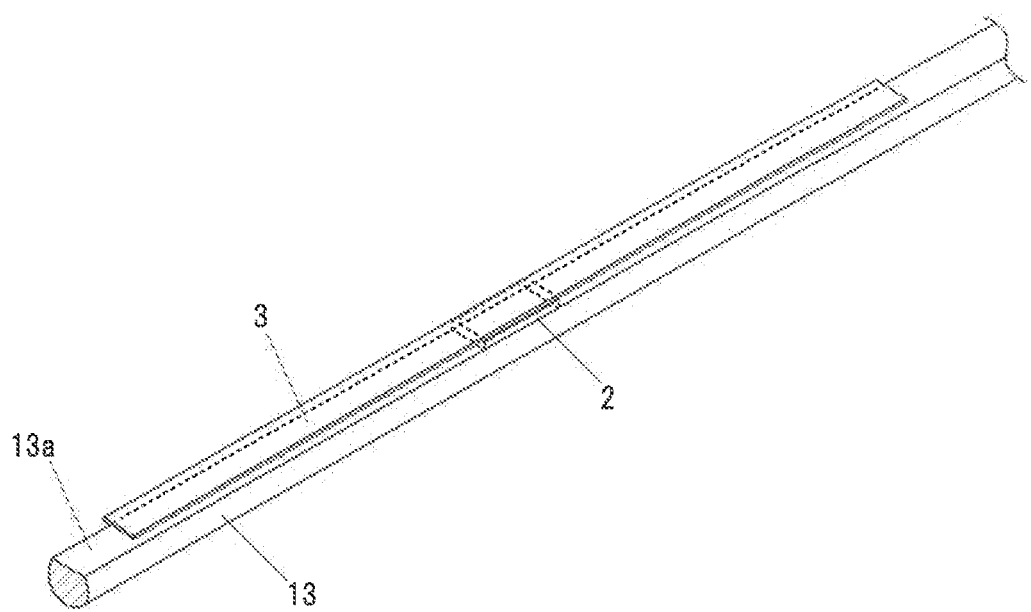
FIG. 2 is a perspective view showing a target and a substrate together with a part of a rack shaft.

FIG. 2 is a perspective view showing the target 2 and substrate 3 together with a part of the rack shaft 13. The target 2 is formed in a rectangular parallelepiped shape elongated in the axial direction of the rack shaft 13. The rack shaft 13 has a planar facing surface 13a facing the substrate 3, and the target 2 is fixed to the facing surface 13a by a fixing means such as adhesion or welding. The substrate 3 has a rectangular shape whose longitudinal direction is the axial direction of the rack shaft 13, and disposed to be parallel to the facing surface 13a of the rack shaft 13 and perpendicular to a radial direction of the rack shaft 13.

The target 2 is one mode of detection objects of the present invention, and is a target for detecting the position of the rack shaft 13. The target 2 is made of a material having a magnetic permeability equal to or higher than that of the rack shaft 13 or a material with an electric conductivity equal to or higher than that of the rack shaft 13. When a material having a magnetic permeability equal to or higher than that of the rack shaft 13 is used for the target 2, a magnetic material such as ferrite can be used as the material. When a material having the conductivity equal to or higher than that of the rack shaft 13 is used for the target 2, a metal comprising such as iron, aluminum, or copper as a main component can be used as the material.

In the present embodiment, the target 2 is provided so as to protrude from the facing surface 13a formed on the rack shaft 13 toward the substrate 3. Even if a material having magnetic permeability equal to the rack shaft 13 or a conductivity equal to the rack shaft 13 is used as the material of the target 2, it is possible to obtain the functions and effects described later. However, in order to improve the position detection accuracy, the target 2 may be preferably made of a material having a higher magnetic permeability than the material of the rack shaft 13 or a material having a higher conductivity than the material of the rack shaft 13.

As shown in FIG. 1B, the substrate 3 is a four-layer substrate in which a flat plate-shaped base material 30 consisting of a dielectric material such as FR4 (Flame Retardant Type 4: a dielectric material that is formed by impregnating glass fiber with epoxy resin and subjecting it to heat curing) is respectively provided between the first to fourth metal layers 301 to 304. A front surface 3a of the substrate 3 on the side of the first metal layer 301 faces the target 2 and the facing surfaces 13a of the rack shaft 13. A rear surface 3b of the substrate 3 on the side of the fourth metal layer 304 is fixed to an inner surface 14a of the housing 14 with an adhesive 6. The thickness of the base material 30 is, e.g., 0.3 mm. Each thickness of the first to fourth metal layers 301 to 304 is, e.g., 18 μm.

The housing 14 is made of non-magnetic metal such as die-cast aluminum alloy. The portion of the housing 14 to which the substrate 3 is attached may be made of a resin material. The target 2 has a rectangular parallelepiped shape, and a facing surface 20a facing the substrate 3 is planar. The facing surface 20a of the target 2 faces the front surface 3a of the substrate 3 in parallel with an air gap G therebetween. The width of the air gap G in the direction perpendicular to the front surface 3a of the substrate 3 is 10 mm or less, e.g., 1 mm. Moreover, the thickness of the target 2 is, e.g., 5 mm.

Figure 3:
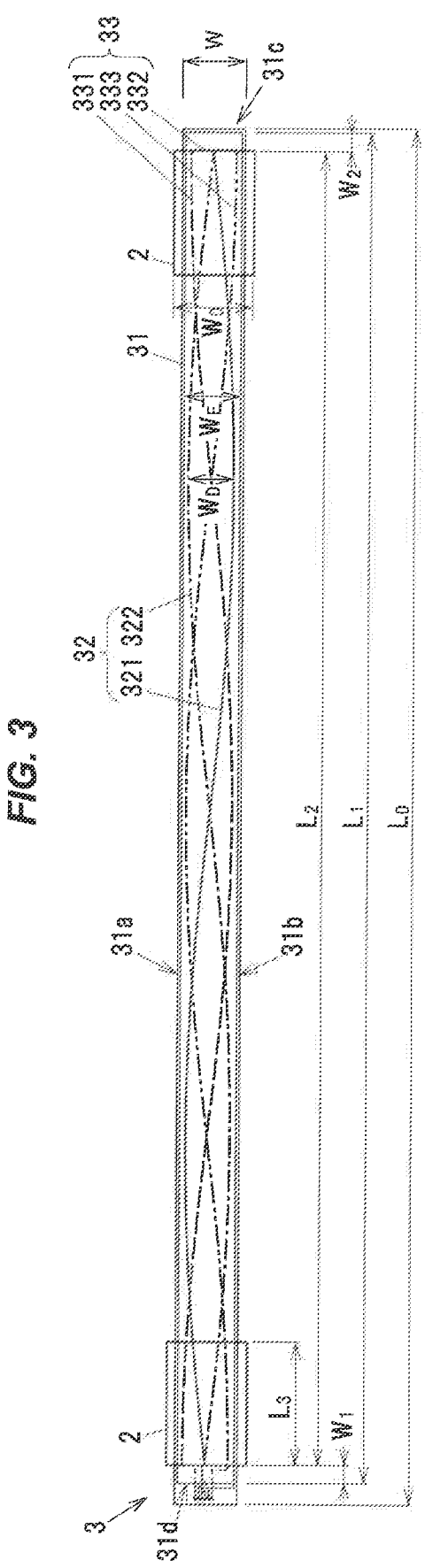
FIG. 3 is a plan view of the substrate viewed from a front surface-side.
Figure 4A:
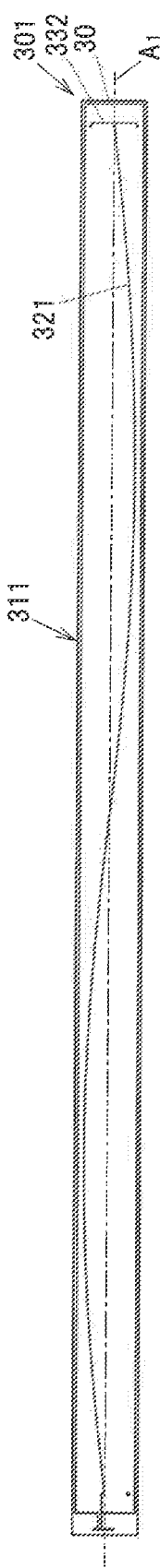
FIGS. 4A to 4D are plan views respectively showing first to fourth metal layers viewed from the front surface-side.
Figure 4B:
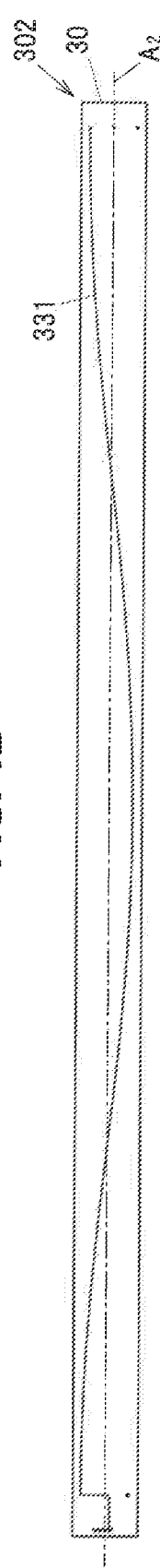
Figure 4C:
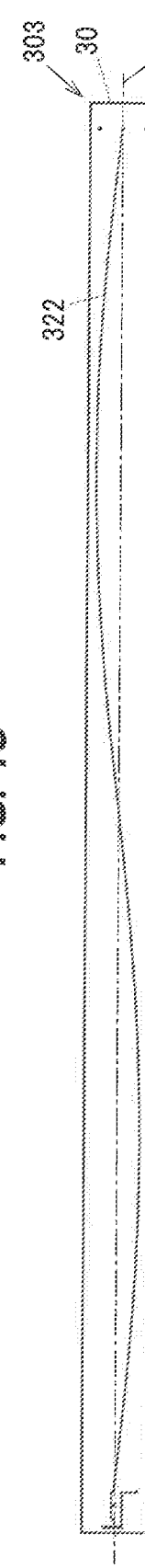
Figure 4D:
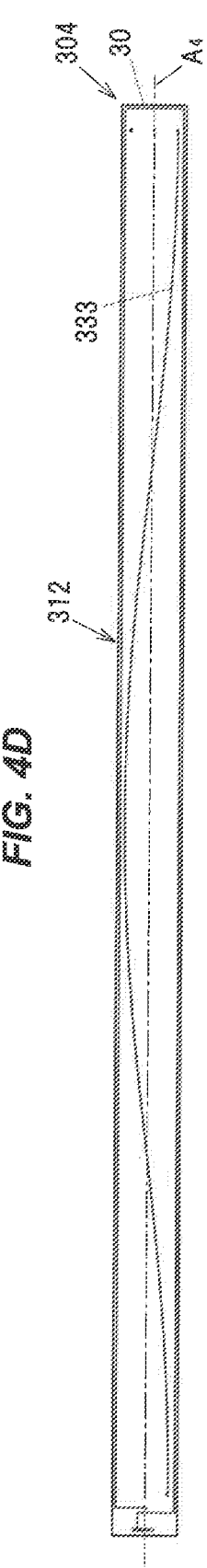

FIG. 3 is a plan view of the substrate 3 viewed from a front surface 3a-side. In FIG. 3, wiring patterns formed on the first to fourth metal layers 301 to 304 are illustrated as perspective, the wiring pattern of the first metal layer 301 is indicated by solid lines, the wiring pattern of the second metal layer 302 is indicated by dashed lines, the wiring pattern of the third metal layer 303 is indicated by one-dot chain lines, and the wiring pattern of the fourth metal layer 304 is indicated by two-dot chain lines, respectively. In FIG. 3, the positions of the target 2, when the rack shaft 13 is positioned at one end and the other end, within a range in which the stroke sensor 1 can detect the absolute position of the rack shaft 13, are shown to be superimposed on the substrate 3. A length $L_0$ of the substrate 3 in a longitudinal direction is e.g., 470 mm, and a width W of the substrate 3 in a short side direction (i.e., lateral direction) is, e.g., 20 mm. A width $W_0$ of the target 2 in a direction parallel to the short side direction of the substrate 3 is equal to or wider than the width W of the substrate 3 in the short side direction.

FIGS. 4A to 4D are plan views respectively showing the first to fourth metal layers 301 to 304 viewed from the front surface 3a-side. FIGS. 5A to 5D are enlarged plan views showing the first to fourth metal layers 301 to 304 at both ends in the longitudinal direction of the substrate 3 viewed from the front surface 3a-side. Hereinafter, for convenience of explanation, the one longitudinal direction side of the substrate 3 corresponding to the right side in FIGS. 4A to 4D and FIGS. 5A to 5D is referred to as the right side, and the other longitudinal side of the substrate 3 corresponding to the left side in FIGS. 4A to 4D and FIGS. 5A to 5D is referred to as the left side. However, the right side and the left side do not necessarily mean left and right in a vehicle short side direction when mounted on the vehicle.

Figure 5A:
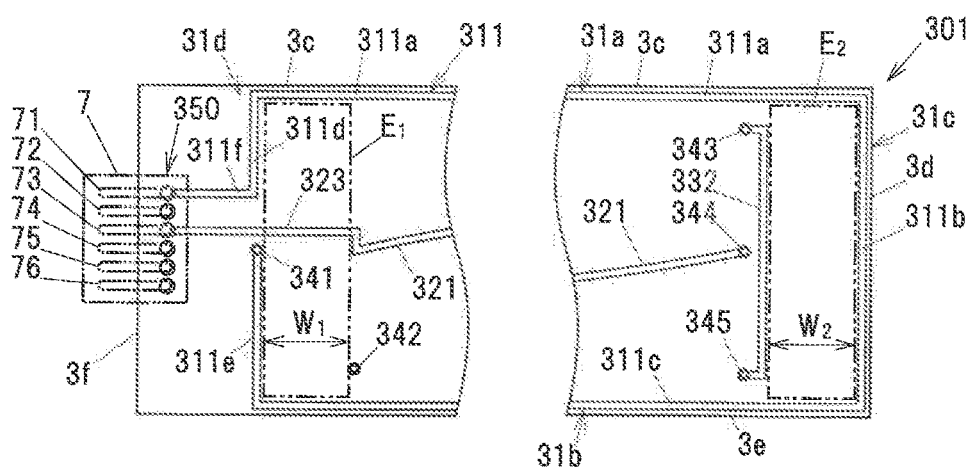
FIGS. 5A to 5D are enlarged plan views showing the first to fourth metal layers at both ends in a longitudinal direction of the substrate viewed from the front surface-side.
Figure 5B:
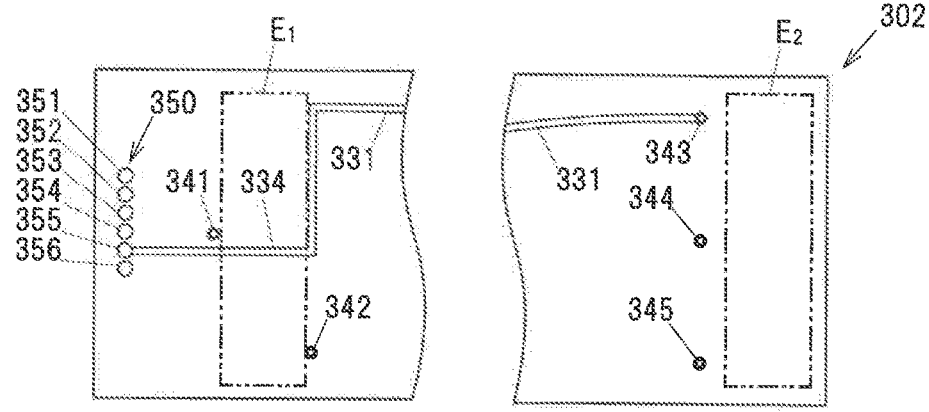
Figure 5C:
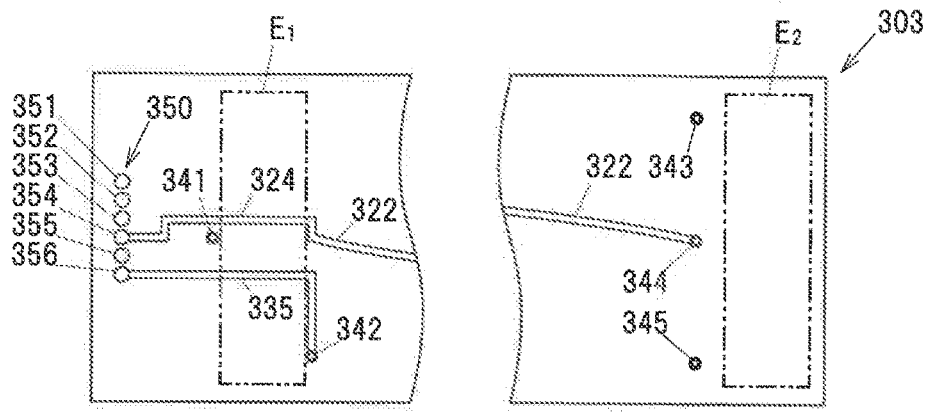
Figure 5D:
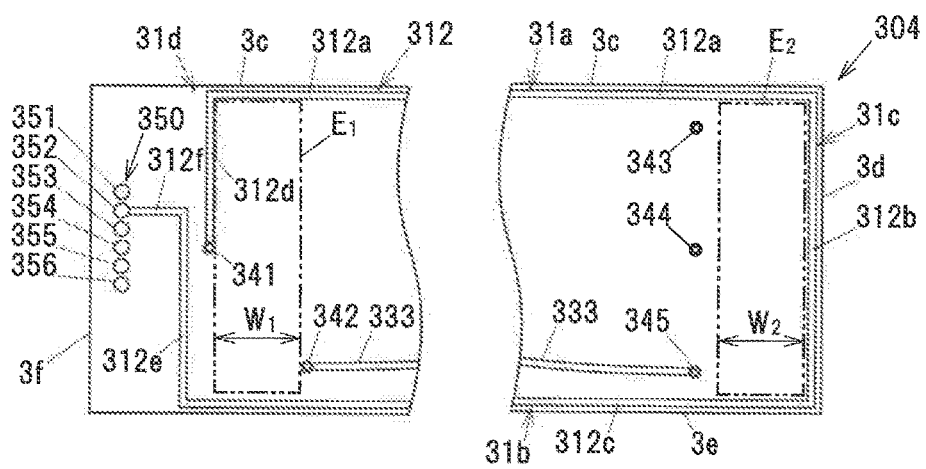

As shown in FIGS. 5A to 5D, the substrate 3 is provided with first to fifth vias 341 to 345 for connecting the wiring patterns of the first to fourth metal layers 301 to 304. Further, at a left end of the substrate 3, a connector connecting portion 350 having first to sixth through holes 351 to 356, through which connector pins 71 to 76 of the connector 7 indicated by two-dot chain lines in FIG. 5A are respectively inserted, is provided. The first to sixth through holes 351 to 356 are arranged in a straight line along the short side direction of the substrate 3. A connector 81 (see FIG. 1A) of the cable 8 for connection with the power source section 4 and the computing section 5 is connected to the connector 7.

The substrate 3 includes an excitation coil 31 that generates an alternating magnetic field, and two detection coils 32 and 33 that are surrounded by the excitation coil 31. That is, the excitation coil 31 and the detection coils 32 and 33 are formed on one substrate 3. The excitation coil 31 and the detection coils 32 and 33 are elongated in the longitudinal direction of the substrate 3 and arranged along the axial direction of the rack shaft 13.

An induced voltage is generated in the detection coils 32 and 33 by interlinking the magnetic flux of the magnetic field generated by the excitation coil 31. When the target 2 is made of a material with a magnetic permeability equal to or higher than a magnetic permeability of the rack shaft 13, the magnetic flux flows intensively in the target 2, and the magnetic flux density in the portion of the substrate 3 facing the target 2 becomes higher than a magnetic flux density of the other portions. In addition, when the target 2 is made of a material having the conductivity equal to or higher than the rack shaft 13, the eddy current generated in the target 2 by the AC magnetic field lowers a density of the magnetic flux interlinking the detection coils 32 and 33, and the magnetic flux density of the portion of the substrate 3 facing the target 2 becomes lower than that of other portions. Therefore, the magnitude of the voltage induced in the detection coils 32 and 33 changes according to the position of the target 2 with respect to the substrate 3. When a material having a magnetic permeability equal to or higher than that of the rack shaft 13 is used as the material of the target 2, it is desirable to use a magnetic material that has high electrical resistance and hardly generates eddy currents.

The phases of the voltages induced in the detection coils 32 and 33 are different from each other while the rack shaft 13 moves from one movement end to the other movement end in the axial direction. In the present embodiment, the phases of the voltages induced in the detection coils 32 and 33 differ by 90°. Hereinafter, of the two detection coils 32 and 33, one detection coil 32 is referred to as a sine waveform detection coil 32 and the other detection coil 33 is referred to as a cosine waveform detection coil 33. The excitation coil 31, the sine waveform detection coil 32, and the cosine waveform detection coil 33 are distributed and formed on the first to fourth metal layers 301 to 304.

The magnitude of the voltage induced in the sine waveform detection coil 32 and the cosine waveform detection coil 33 varies in a range equal to or less than one cycle while the rack shaft 13 moves from the one movement end to the other movement end in the axial direction. Thereby, the stroke sensor 1 can detect the absolute position of the rack shaft 13 over an entire range $R_1$ in which the rack shaft 13 can move in the axial direction.

The sine waveform detection coil 32 and the cosine waveform detection coil 33 have a shape obtained by combining a pair of sinusoidal conductor wires when viewed in a direction perpendicular to the axial direction of the rack shaft 13. The pair of sinusoidal conductor wires are symmetrical across symmetry axes $A_1$ to $A_4$ parallel to the axial direction of the rack shaft 13. That is, when one of the pair of sinusoidal conductor wires is reversed vertically with respect to the symmetry axes $A_1$ to $A_4$, the shape of the other conductor wire is obtained. In FIGS. 4A to 4D, the symmetry axes $A_1$ to $A_4$ are indicated by dashed lines.

The sine waveform detection coil 32 is composed of a wavy conductor wire 321 of the first metal layer 301, a wavy conductor wire 322 of the third metal layer 303, and the fourth via 344. The wavy conductor wires 321 and 322 are sinusoidal. The fourth via 344 connects right ends of the wavy conductor wires 321 and 322. A left end of the wavy conductor wire 321 of the first metal layer 301 is connected to the third through hole 353 by a connection conductor wire 323 of the first metal layer 301. A left end of the wavy conductor wire 322 of the third metal layer 303 is connected to the fourth through hole 354 by a connection conductor wire 324 of the third metal layer 303.

The cosine waveform detection coil 33 is composed of a wavy conductor wire 331 of the second metal layer 302, a connection conductor wire 332 of the first metal layer 301, a wavy conductor wire 333 of the fourth metal layer 304, and third and fifth vias 343 and 345. The wavy conductor wires 331 and 333 are sinusoidal. A right end of the wavy conductor wire 331 of the second metal layer 302 is connected to the third via 343. A right end of the wavy conductor wire 333 of the fourth metal layer 304 is connected to the fifth via 345. A connection conductor wire 332 of the first metal layer 301 connects the third via 343 and the fifth via 345. A left end of the wavy conductor wire 331 of the second metal layer 302 is connected to the fifth through hole 355 by a connection conductor wire 334 of the second metal layer 302. A left end of the wavy conductor wire 333 of the fourth metal layer 304 is connected to the second via 342. The second via 342 and the sixth through hole 356 are connected to each other by a connection conductor wire 335 of the third metal layer 303.

Thus, on the substrate 3, the wavy conductor wires 321 and 322 that are parts of the sine waveform detection coil 32 are formed on the first metal layer 301 and the third metal layer 303, respectively, and the wavy conductor wires 331 and 333 that are parts of the cosine waveform detection coil 33 are formed on the second metal layer 302 and the fourth metal layer 304, respectively. As a result, for example, as compared to the case where one detection coil is formed by a combination of wavy conductor wires respectively formed on the first metal layer 301 and the second metal layer 302 and the other detection coil is formed by a combination of wave conductor wires respectively formed on the third metal layer 303 and the fourth metal layer 304, a difference in the average distance from the target 2 to the sine waveform detection coil 32 and the cosine waveform detection coil 33 is reduced.

As shown in FIG. 3, the excitation coil 31 has a pair of long side portions 31a, 31b extending in the longitudinal direction of the substrate 3 and sandwiching the sine waveform detection coil 32 and the cosine waveform detection coil 33 in the short side direction of the substrate 3, and a pair of short side portions 31c, 31d extending in the short side direction of the substrate 3 and sandwiching the sine waveform detection coil 32 and the cosine waveform detection coil 33 in the longitudinal direction of the substrate 3. The excitation coil 31 is formed so as to surround the sine waveform detection coil 32 and the cosine waveform detection coil 33.

In the present embodiment, the excitation coil 31 has a first excitation coil portion 311 formed on the first metal layer 301, and a second excitation coil portion 312 formed on the fourth metal layer 304. The first excitation coil portion 311 has a starting end connected to the first through hole 351 and a terminal end connected to the first via 341. The second excitation coil portion 312 has a starting end connected to the first via 341 and a terminal end connected to the second through hole 352.

The first excitation coil portion 311 includes a longitudinal conductor wire 311a extending along one end 3c of both ends in the short side direction of the substrate 3, a short side conductor wire 311b extending along a right end 3d of the substrate 3, a longitudinal conductor wire 311c extending along the other end 3e of the both ends of the substrate 3 in the short side direction, and short side conductor wires 311d, 311e extending along a left end 3f of the substrate 3. The short side conductor wire 311d and the first through hole 351 are connected to each other by a connection line 311f. The short side conductor wire 311e is connected to the first via 341.

The second excitation coil portion 312 includes a longitudinal conductor wire 312a extending along the one end 3c of both ends in the short side direction of the substrate 3, a short side conductor wire 312b extending along the right end 3d of the substrate 3, a longitudinal conductor wire 312c extending along the other end 3e of the both ends of the substrate 3 in the short side direction, and short side conductor wires 312d, 312e extending along the left end 3f of the substrate 3. The short side conductor wire 312e and the second through hole 352 are connected to each other by a connection line 312f. The short side conductor wire 312d is connected to the first via 341.

Of the pair of long side portions 31a, 31b of the excitation coil 31, one long side portion 31a is composed of the longitudinal conductor wire 311a of the first excitation coil portion 311 and the longitudinal conductor wire 312a of the second excitation coil portion 312. The other long side portion 31b is composed of the longitudinal conductor wire 311c of the first excitation coil portion 311 and the longitudinal conductor wire 312c of the second excitation coil portion 312.

Of the pair of short side portions 31c, 31d of the excitation coil 31, one short side portion 31c is composed of the short side conductor wire 312b of the first excitation coil portion 311 and the short side conductor wire 312b of the second excitation coil portion 312. The other short side portion 31d is composed of the short side conductor wires 311d, 311e of the first excitation coil portion 311 and the short side conductor wires 312d, 312e of the second excitation coil portion 312.

Between each of the pair of short side portions 31c, 31d of the excitation coil 31 and the sine waveform detection coil 32 and the cosine waveform detection coil 33, buffer regions $E_1$ and $E_2$ are provided to suppress the voltage generated in the sine waveform detection coil 32 and the cosine waveform detection coil 33 due to magnetic fields generated by the current flowing through the pair of short side portions 31c, 31d. As a result, the accuracy of position detection by the stroke sensor 1 is enhanced. In the present embodiment, the width $W_1$ of the buffer region $E_1$ on the left side and the width $W_2$ of the buffer region $E_2$ on the right side in the longitudinal direction of the substrate 3 are the same. However, the width $W_1$ and the width $W_2$ may not be the same.

As shown in FIG. 5, the connection conductor wire 323 of the first metal layer 301, the connection conductor wire 334 of the second metal layer 302, and the connection conductor wires 324, 335 of the third metal layer 303 extend linearly along the longitudinal direction of the substrate 3 in the buffer region $E_1$. The third through hole 353 and the fourth through hole 354, which are the output ends of the sine waveform detection coil 32, are adjacent to each other. The fifth through hole 355 and the sixth through hole 356, which are the output ends of the cosine waveform detection coil 33, are adjacent to each other. As a result, fluctuation in the output voltage of the sine waveform detection coil 32 due to the magnetic flux interlinking between the connection conductor wire 323 of the first metal layer 301 and the connection conductor wire 324 of the third metal layer 303 is suppressed. In addition, fluctuation in the output voltage of the cosine waveform detection coil 33 due to the magnetic flux interlinking between the connection conductor wire 334 of the second metal layer 302 and the connection conductor wire 335 of the third metal layer 303 is suppressed.

As shown in FIG. 3, when a length of the sine waveform detection coil 32 and the cosine waveform detection coil 33 in the longitudinal direction of the substrate 3 is $L_2$, and a length of the target 2 in the same direction is $L_3$, the longer the length $L_3$ of the target 2, the larger the amount of change in the output voltage of the sine waveform detection coil 32 and the cosine waveform detection coil 33 according to the position of the target 2, and the higher the position detection accuracy. However, the stroke sensor 1 can accurately detect the positions of the target 2 and the rack shaft 13 within a range in which the entire length $L_3$ of the target 2 is included in the length $L_2$ of the sine waveform detection coil 32 and the cosine waveform detection coil 33. Therefore, the longer the length $L_3$ of the target 2, the narrower the detectable range of the stroke sensor 1 becomes. That is, the detectable range of the stroke sensor 1 is the length range of ($L_2$-$L_3$). Therefore, the length $L_3$ of the target 2 is preferably half or less of the length $L_2$ of the sine waveform detection coil 32 and the cosine waveform detection coil 33. A more desirable range of the length $L_3$ of the target 2 with respect to the length $L_2$ of the cosine waveform detection coil 33 is 1% or more and 50% or less.

Further, as shown in FIG. 3, when a length of the excitation coil 31 in the longitudinal direction of the substrate 3 is $L_1$, a width of the excitation coil 31 in the short side direction of the substrate 3 is $W_E$, and a width of the sine waveform detection coil 32 and the cosine waveform detection coil 33 is $W_D$, the widths W1 and W2 of the buffer regions $E_1$ and $E_2$ in the longitudinal direction of the substrate 3 are desirably ($W_D/W_E$)×$L_2$×0.004 or more.

Operation of the Stroke Sensor 1

Next, the operation and effects of the stroke sensor 1 for detecting the position of the target 2 with respect to the substrate 3 will be described with reference to FIGS. 6 to 9. Here, the axial direction of the rack shaft 13 is defined as X axis, the X coordinate of the position of the left end is 0 and the X coordinate of the position on the right end is 1, in the range of the length $L_1$ of the excitation coil 31 in the longitudinal direction of the substrate 3. Also, the position of the target 2 is represented by the X coordinate of the center portion of the target 2 in the length direction.

FIG. 6 is a graph showing an example of relationships between a supply voltage $V_0$ supplied from the power source section 4 to the excitation coil 31 and an induced voltage $V_1$ induced in the sine waveform detection coil 32 as well as an induced voltage $V_2$ induced in the cosine waveform detection coil 33. The horizontal axis of the graph in FIG. 6 is a time axis, and the left and right vertical axes indicate the supply voltage $V_0$ and the induced voltages $V_1$ and $V_2$. The induced voltage $V_1$ is the output voltage of the sine waveform detection coil 32, and the induced voltage $V_2$ is the output voltage of the cosine waveform detection coil 33.

In the example shown in FIG. 6, the supply voltage $V_0$ supplied to the excitation coil 31 and the induced voltages $V_1$ and $V_2$ induced in the sine waveform detection coil 32 and the cosine waveform detection coil 33 are in phase (i.e., the same phase). However, when the X-coordinate of the target 2 exceeds 0.5, the induced voltage $V_1$ induced in the sine waveform detection coil 32 is in phase opposite to the supply voltage $V_0$ supplied to the excitation coil 31. In addition, the induced voltage $V_2$ induced in the cosine waveform detection coil 33 alternates between in-phase and out-of-phase, each time when the target 2 passes the position where the wavy conductor wire 331 of the second metal layer 302 and the wavy conductor wire 333 of the fourth metal layer 304 cross each other. A high-frequency AC voltage of, e.g., about 1 MHz to 1 GHz is supplied to the excitation coil 31 as the supply voltage $V_0$.

Figure 7:
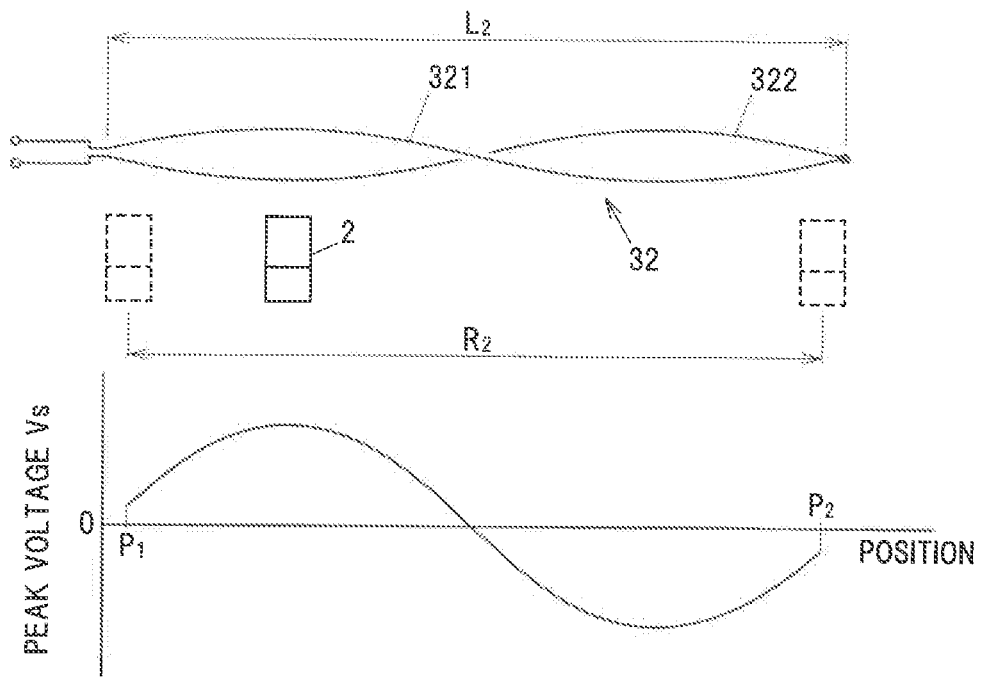
FIG. 7 is an explanatory diagram schematically showing a relationship between a peak voltage of the induced voltage induced in the sine waveform detection coil and a position of the target.
Figure 8:
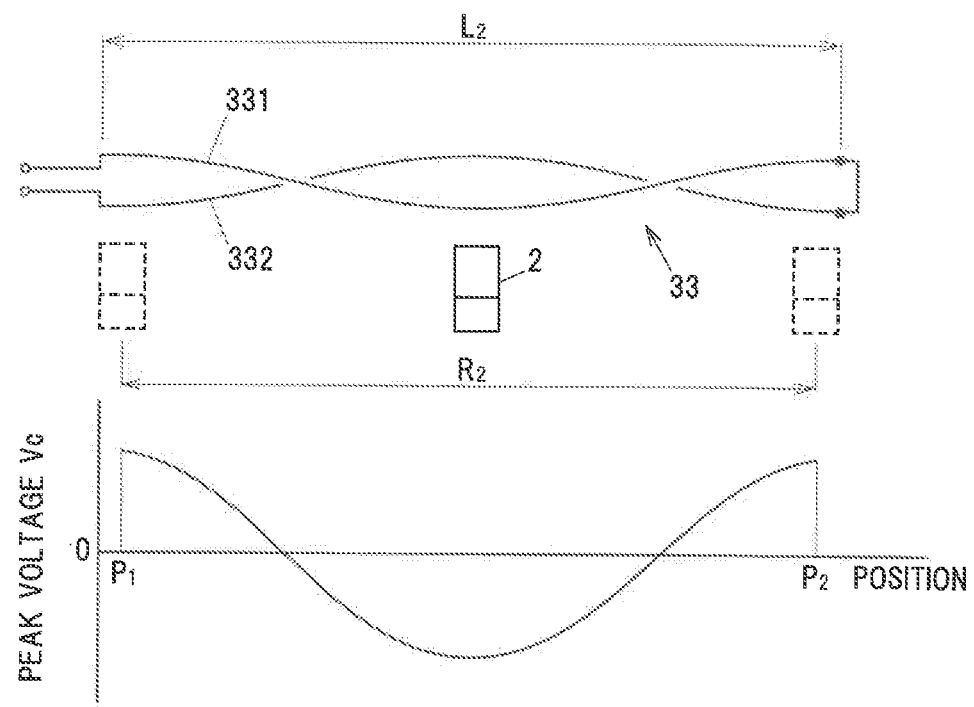
FIG. 8 is an explanatory diagram schematically showing a relationship between a peak voltage of the induced voltage induced in the cosine waveform detection coil and the position of the target.

FIG. 7 is an explanatory diagram schematically showing a relationship between a peak voltage $V_S$, which is a peak value of the induced voltage $V_1$ induced in the sine waveform detection coil 32 and the position of the target 2. FIG. 8 is an explanatory diagram schematically showing a relationship between a peak voltage $V_C$, which is a peak value of the induced voltage $V_2$ induced in the cosine waveform detection coil 33 and the position of the target 2.

The stroke sensor 1 can detect the position of the target 2 within an axial range $R_2$ obtained by subtracting the length $L_3$ of the target 2 from the length $L_2$ of the sine waveform detection coil 32 and the cosine waveform detection coil 33.

In the graphs shown in FIGS. 7 and 8, $P_1$ is the X coordinate when the target 2 is at the left end of the axial range $R_2$, and $P_2$ is the X coordinate when the target 2 is at the right end of the axial range $R_2$. The peak voltages $V_S$ and $V_C$ at respective positions are shown with the X-coordinates $P_1$ and $P_2$. The peak voltage $V_S$ of the sine waveform detection coil 32 is positive when the induced voltage $V_1$ induced in the sine waveform detection coil 32 is in phase with the supply voltage $V_0$ supplied to the excitation coil 31, and is negative when the induced voltage $V_1$ induced in the sine waveform detection coil 32 is in opposite phase with the supply voltage $V_0$ supplied to the excitation coil 31. Similarly, the peak voltage $V_C$ of the cosine waveform detection coil 33 is positive when the induced voltage $V_2$ induced in the cosine waveform detection coil 33 is in phase with the supply voltage $V_0$ supplied to the excitation coil 31, and is negative when the induced voltage $V_2$ induced in the cosine waveform detection coil 33 is in opposite phase with the supply voltage $V_0$ supplied to the excitation coil 31.

Here, if $\omega x$ is defined as in Equation 1, peak voltages $V_S$ and $V_C$ are obtained by Equations 2 and 3, respectively, with the X coordinate of the target 2 being Xp. A in Equations 2 and 3 is a predetermined constant.

Equation 1

$$\omega_x = \frac{2\pi}{L_2} \tag{1}$$

Equation 2

$$V_s = A \sin\{\omega_x(X_p - W_1)\} \tag{2}$$

Equation 3

$$V_c = A \cos\{\omega_x(X_p - W_1)\} \tag{3}$$

From Equations 2 and 3, the X coordinate Xp of the target 2 is obtained by Equation 4. That is, the computing section 5 can calculate the X coordinate of the target 2 with respect to the substrate 3 based on the peak voltages $V_S$ and $V_C$.

Equation 4

$$X_p = \frac{\arctan\left(\frac{V_s}{V_c}\right)}{\omega_x} + W_1 \tag{4}$$

Figure 9:
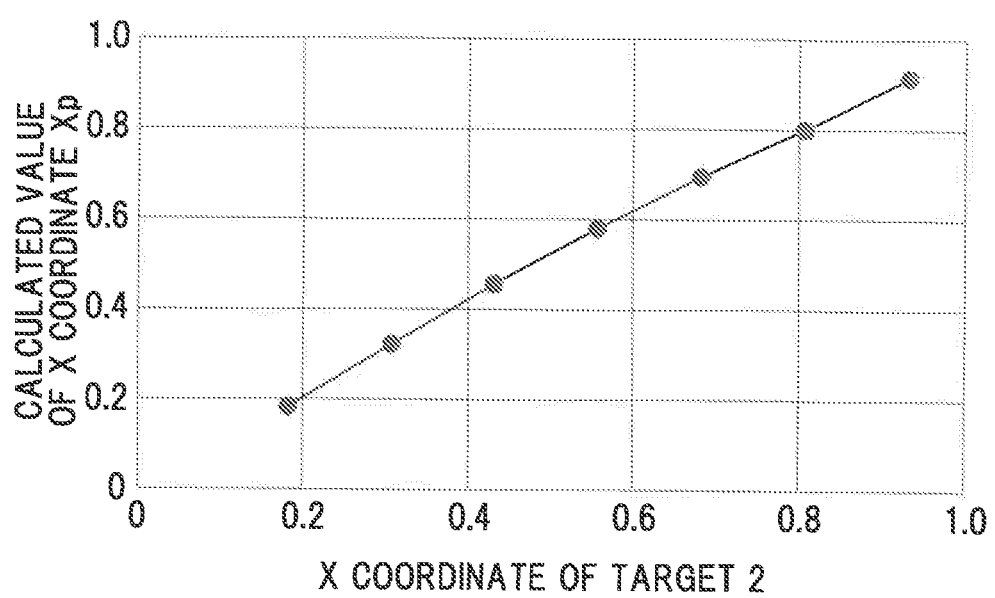
FIG. 9 is a graph showing results of evaluation of position detection accuracy of a stroke sensor using electromagnetic field simulation.

FIG. 9 is a graph showing the results of evaluating the position detection accuracy of the stroke sensor 1 using electromagnetic field simulation. In this graph, the horizontal axis represents the X coordinate of the target 2, and the vertical axis represents the calculated value of the X coordinate Xp of the target 2 based on the above calculation result. As shown in FIG. 9, the stroke sensor 1 can detect the position of the target 2 with high accuracy. However, a slight error occurs due to the difference in the distance between the target 2 and each of the first to fourth metal layers 301 to 304 on the substrate 3, and the non-uniformity of the magnetic flux density corresponding to the distance from the long side portions 31a, 31b in an inner portion of the excitation coil 31. However, since this error does not occur accidentally due to vibration or the like, but occurs constantly as a detection characteristic, it can be corrected by calculation. That is, the computing section 5 performs a correction calculation according to the detection characteristics on the value of the X coordinate Xp of the target 2 obtained by the above calculation, so that the position of the target 2, i.e., the position of the rack shaft 13, can be obtained with higher accuracy.

Since the substrate 3 thermally expands more easily than the rack shaft 13, the value of the X coordinate Xp of the target 2 obtained by calculation may be subjected to temperature correction. In this case, the computing section 5 performs temperature correction calculation based on the detected value of a temperature sensor mounted on the substrate 3, for example. This enables more accurate position detection.

Functions and Effects of the Embodiment

As described above, the stroke sensor 1 according to the present embodiment can detect the position of the rack shaft 13 with high accuracy. For example, even if the rack shaft 13 is displaced in the vehicle longitudinal direction with respect to the housing 14 due to vibration caused by running of the vehicle, or if the rack shaft 13 rotates slightly around its center axis, the displacement and rotation will have little effect on the position detection accuracy. In addition, since the excitation coil 31, the sine waveform detection coil 32, and the cosine waveform detection coil 33 are formed as wiring patterns on one substrate (i.e., a single substrate) 3, these coils can be formed at low cost, and an increase in size of the housing 14 can be suppressed.

First Modified Example

FIG. 10 is a plan view showing a substrate 3A according to the first modified example. In the above embodiment, the case where the wavy conductor wires 321 of the first metal layer 301, the wavy conductor wire 331 of the second metal layer 302, the wavy conductor wire 322 of the third metal layer 303, and the wavy conductor wire 333 of the fourth metal layer 304 the wavy conductor wire 333, each of which has a sine waveform has been described. However, in the first modified example, each of these wavy conductor wires 321, 331, 322, and 333 has a triangular waveform. On the substrate 3A, the wavy conductor wire 321 of the first metal layer 301 and the wavy conductor wire 322 of the third metal layer 303 are combined to form a first detection coil 32A. The wavy conductor wire 331 of the second metal layer 302 and the wavy conductor wire 333 of the fourth metal layer 304 are combined to form a second detection coil 33A. The phases of the voltages induced in the first and second detection coils 32A and 33A differ by 90° while the rack shaft 13 moves from one movement end to the other movement end in the axial direction.

Even when this substrate 3A is used, the position of the target 2 can be detected with high accuracy by the output voltages of the first detection coil 32A and the second detection coil 33A, as in the above embodiment.

Second Modified Example

FIG. 11 is a plan view showing a substrate 3B and a target 2B according to the second modified example. In the above embodiment, the case where the sine waveform detection coil 32 and the cosine waveform detection coil 33 overlap in the thickness direction of the substrate 3 has been described. In the second modified example, a sine waveform detection coil 32B and a cosine waveform detection coil 33B are arranged in the short side direction of the substrate 3B and are formed so as not to overlap in the thickness direction of the substrate 3B. The substrate 3B has a wider width in the short side direction than the substrate 3 according to the above embodiment, and the width of the target 2B in the short side direction of the substrate 3B is equal to or wider than the width of the substrate 3B.

In this substrate 3B, the induction of voltage in the cosine waveform detection coil 33B by the magnetic field generated by the current flowing in the sine waveform detection coil 32B is suppressed, and the induction of voltage in the sine waveform detection coil 32B by the magnetic field generated by the current flowing in the cosine waveform detection coil 33B is suppressed. Thereby, the position of the target 2B can be detected with higher accuracy.

Further, the substrate 3B may be a two-layer substrate, and for example, if the wavy conductor wire 331 and the connection conductor wire 332 of the cosine waveform detection coil 33B are formed in the same layer as the wavy conductor wire 321 of the sine waveform detection coil 32B and the wavy conductor wire 333 of the cosine waveform detection coil 33B are formed in the same layer as the wavy conductor wire 322 of the sine waveform detection coil 32B, so that the distance between the target 2B and the sine waveform detection coil 32B and the cosine waveform detection coil 33B can be shortened, and the distance between the target 2B and the sine waveform detection coil 32B can be made the same as the distance between the target 2B and the cosine waveform detection coil 33B. Thereby, the position of the target 2B can be detected with higher accuracy.

Third Modified Example

Figure 12:
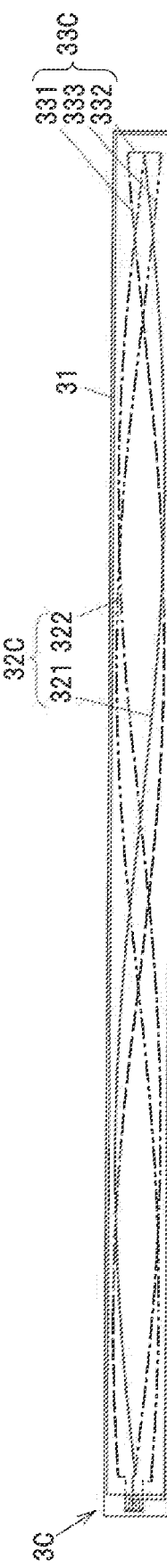
FIG. 12 is a plan view showing a substrate according to a third modified example.
Figure 13A:
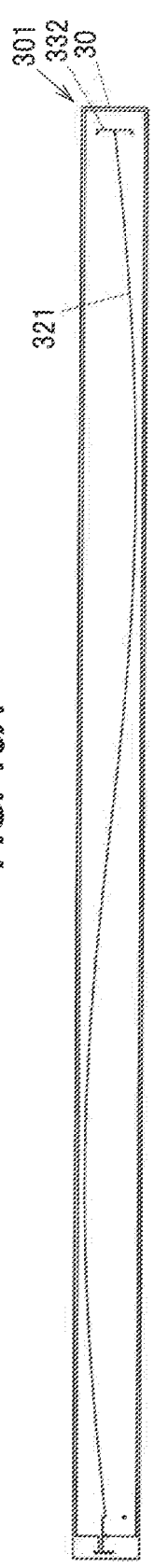
FIGS. 13A to 13D are plan views showing first to fourth metal layers of the substrate according to the third modified example.
Figure 13B:
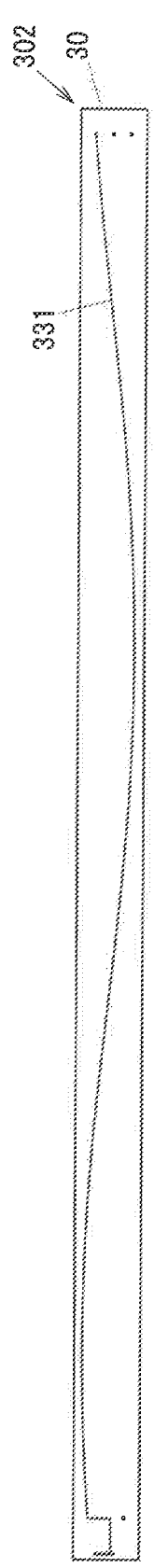
Figure 13C:
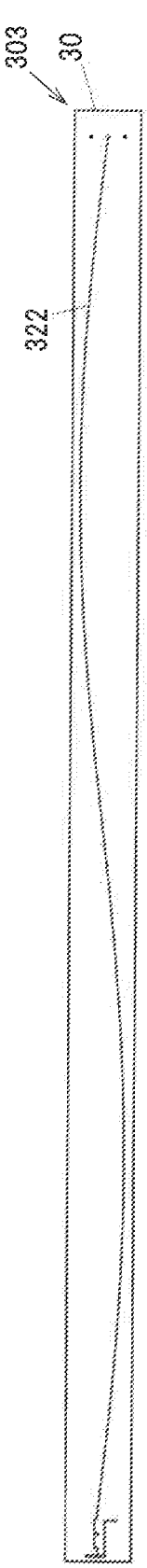
Figure 13D:
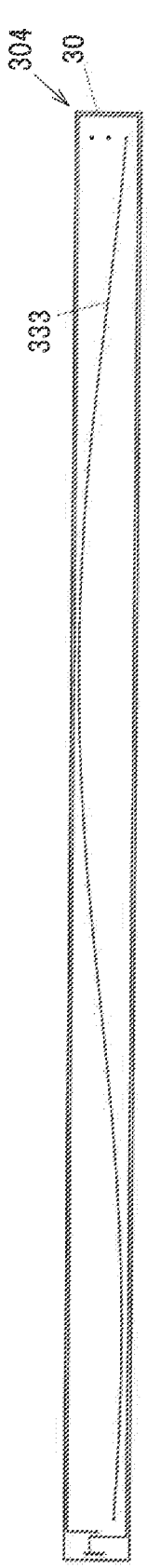

FIG. 12 is a plan view showing a substrate 3C according to a third modified example. FIGS. 13A to 13D are plan views showing the first to fourth metal layers 301 to 304 of the substrate 3C. In the above embodiment, the case where the phases of the voltages induced in the sine waveform detection coil 32 and the cosine waveform detection coil 33 differ by 90° has been described. In the third modified example, a sine waveform detection coil 32C and a cosine waveform detection coil 33C are formed on the substrate 3C but the difference between phases of the voltages induced in the sine waveform detection coil 32C and the cosine waveform detection coil 33C is not 90°. FIGS. 12 and 13A to 13D show an example where the phase difference between the voltages induced in the sine waveform detection coil 32C and the cosine waveform detection coil 33C is smaller than 90° and is 45°. The sine waveform detection coil 32C and the cosine waveform detection coil 33C may be formed in such a manner that this phase difference is greater than 90°.

Even when this substrate 3C is used, the position of the target 2C can be calculated by using a predetermined arithmetic expression in the computing section 5 based on the output voltages of the sine waveform detection coil 32C and the cosine waveform detection coil 33C. The absolute position of the target 2C can be uniquely detected in the same manner as in the above embodiment.

Fourth Modified Example

Figure 14A:
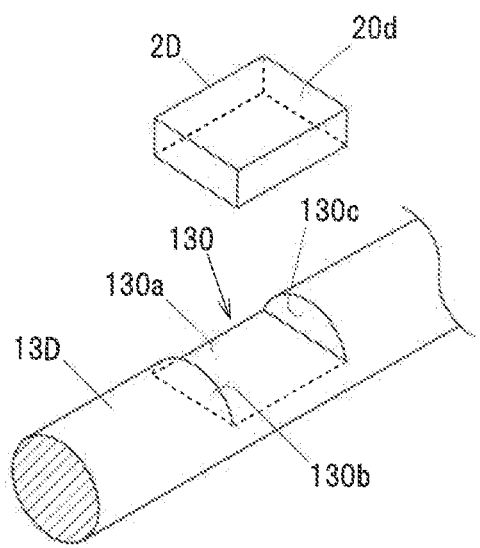
FIG. 14A is a perspective view showing a target according to a fourth modified example together with a rack shaft.
Figure 14B:
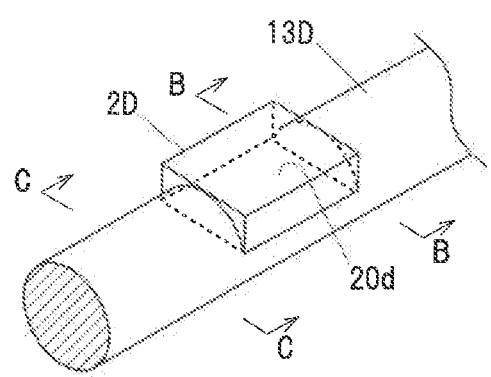
FIG. 14B is a perspective view showing a state in which the target is attached to the rack shaft.
Figure 15A:
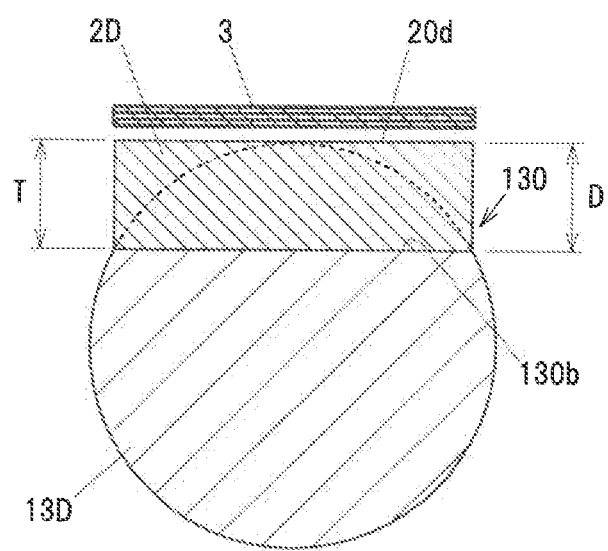
FIG. 15A is a cross-sectional view showing a B-B line cross-section of FIG. 14B together with the substrate.
Figure 15B:
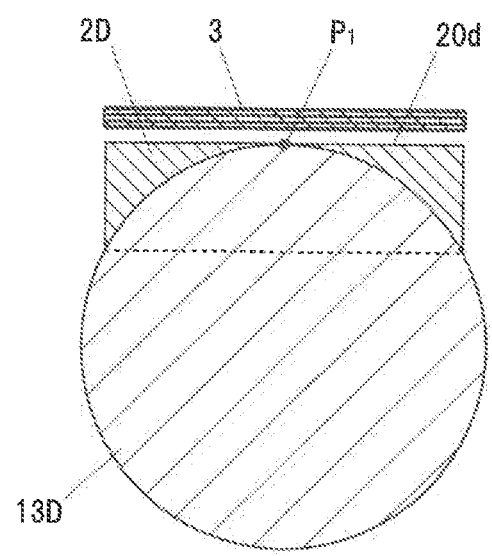
FIG. 15B is a cross-sectional view showing a C-C line cross-section of FIG. 14B together with the substrate.

FIG. 14A is a perspective view showing a target 2D according to a fourth modified example together with a rack shaft 13D to which the target 2D is attached. FIG. 14B is a perspective view showing a state in which the target 2D is attached to the rack shaft 13D. FIG. 15A is a cross-sectional view showing a B-B line cross-section of FIG. 14B of the target 2D together with the substrate 3 facing to the target 2D. FIG. 15B is a cross-sectional view showing a C-C line cross-section of FIG. 14B of the target 2D together with the substrate 3 facing to the target 2D.

In the above embodiment, the case where the target 2 is fixed to the planar facing surface 13a of the rack shaft 13 facing the substrate 3 has been explained. In the fourth modified example, a recess 130 is formed at the rack shaft 13D, and a part of the target 2D is embedded in this recess 130. The recess 130 is defined by a bottom surface 130a and a pair of side surfaces 130b, 130c facing each other in the axial direction of the rack shaft 13D with respect to the bottom surface 130a interposed therebetween. The bottom surface 130a is a plane parallel to the substrate 3.

As with the target 2 of the above embodiment, the target 2D is made of a material having a magnetic permeability equal to or higher than that of the rack shaft 13D, or a material having a conductivity equal to or higher than that of the rack shaft 13D. Although the target 2D is also made of a material having high conductivity and is formed in a rectangular parallelepiped shape, in this modified example, the target 2D is fixed to the rack shaft 13D with a part of the target 2D embedded in the recess 130. As shown in FIG. 15B, the rack shaft 13D has a circular cross-section perpendicular to the axial direction in the axially forward and backward portions of the portion where the recess 130 is formed.

As shown in FIG. 15A, a depth D of the recess 130 in the direction perpendicular to the substrate 3 is equivalent to the thickness T of the target 2D in the same direction. However, the thickness T of the target 2D may be thicker than the depth D of the recess 130. Also, the entire target 2D may be embedded in the recess 130. That is, at least a part of the target 2D should be embedded in the recess 130.

According to this fourth modified example, the amount of protrusion (i.e., projection amount) of the target 2D from the recess 130 toward the substrate 3-side can be suppressed to 0 (zero) or a small value while ensuring the thickness of the target 2D. That is, when the nearest point of the rack shaft 13D to the substrate 3 in the axially forward and backward portions of the portion where the recess 130 is formed is a point P1 as shown in FIG. 15B, the projection amount of the target 2D to the substrate 3-side is suppressed to 0 (zero) or a small value. This enables space saving of the stroke sensor.

Even if a material having the same magnetic permeability as the rack shaft 13D or a material having the same conductivity as the rack shaft 13D is used as the material of the target 2D, the rack shaft 13D has a circular cross-section perpendicular to the axial direction in the axially forward and backward portions of the portion where the recess 130 is formed while a facing surface 20d of the target 2D facing the substrate 3 is planar parallel to the substrate 3. Therefore, a magnetic flux density difference occurs between the portion of the substrate 3 facing the target 2D and the portion not facing the target 2D. As a result, the position of the rack shaft 13D can be detected in the same manner as in the above embodiment. However, it is desirable to use a high magnetic permeability material having a higher magnetic permeability than the rack shaft 13D or a high conductivity material having higher conductivity than the rack shaft 13D as the material of the target 2 in order to improve the position detection accuracy. It is similar to the above embodiment.

Fifth Modified Example

Figure 16A:
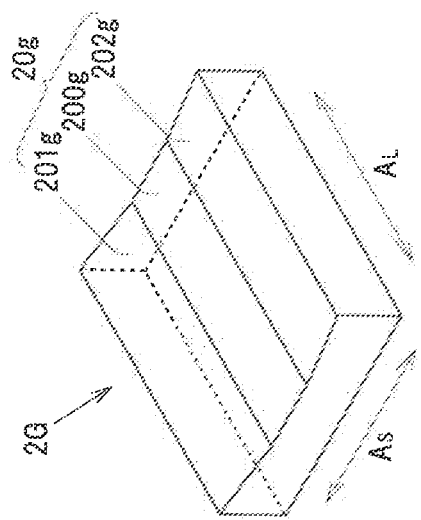
FIGS. 16A to 16C are perspective views showing a target according to a fifth modified example.
Figure 16B:
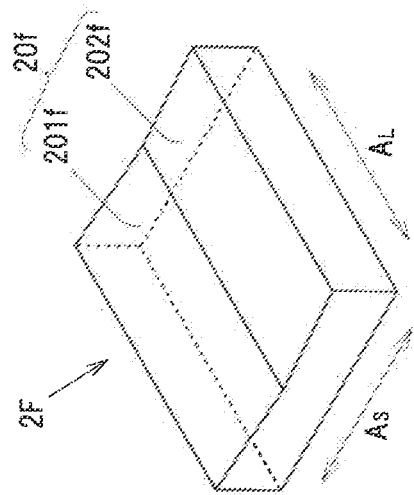
Figure 16C:
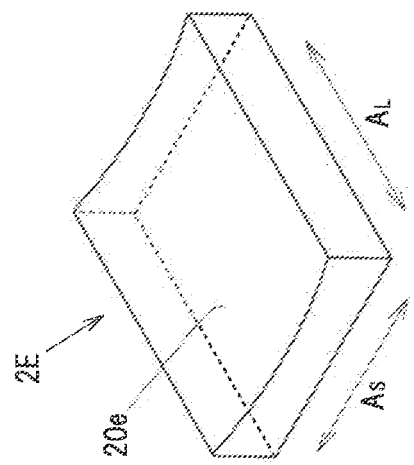
Figure 17A:
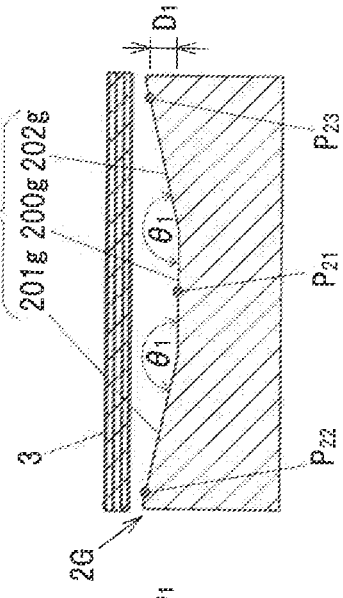
FIGS. 17A to 17C are cross-sectional views showing cross-sections of the target according to the fifth modified example together with the substrate.
Figure 17B:
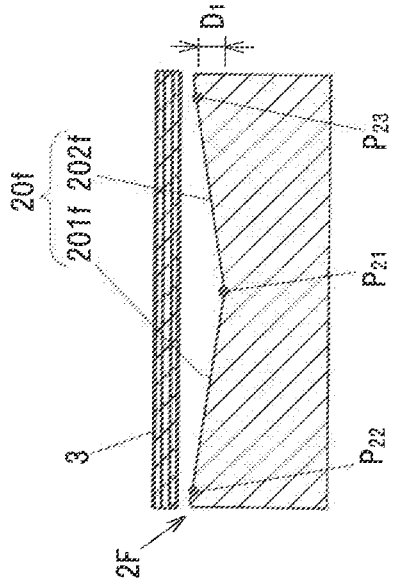
Figure 17C:
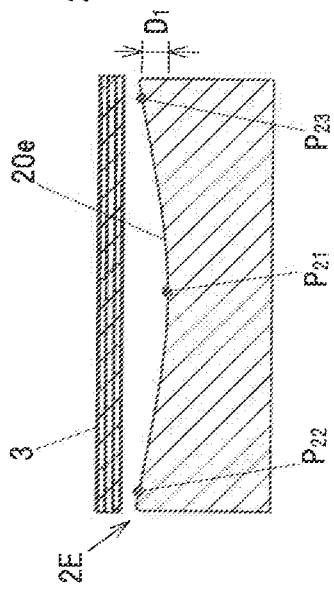

FIGS. 16A to 16C are perspective views showing targets 2E, 2F, and 2G according to the fifth modified example. FIGS. 17A to 17C are cross-sectional views showing cross-sections of the targets 2E, 2F, and 2G together with the substrate 3. In FIGS. 17A to 17C, the longitudinal direction of the substrate 3 is indicated by an arrow AL, and the short side direction of the substrate 3 is indicated by an arrow AS. FIGS. 17A to 17C show cross-sections perpendicular to the longitudinal direction of the substrate 3.

Targets 2E, 2F, and 2G are fixed to the rack shaft 13 and arranged to face the substrate 3. The targets 2E, 2F, and 2G are made of a material with the same conductivity as the rack shaft 13 or higher conductivity than the rack shaft 13. Each of a facing surface 20e of the target 2E facing the substrate 3, a facing surface 20f of the target 2F facing the substrate 3, and a facing surface 20g of the target 2G facing the substrate 3 is formed as a recess in such a manner that the distance from each facing surface to the substrate 3 is the longest at the position aligned in the thickness direction of the substrate 3 with the center portions in the short side direction of the substrate 3 in the sine waveform detection coil 32 and the cosine waveform detection coil 33.

The facing surface 20e of the target 2E facing the substrate 3 is concavely curved as shown in FIG. 17A. The facing surface 20f of the target 2F facing the substrate 3 has a valley shape composed of inclined surfaces 201f, 202f that are inclined with respect to a direction parallel to the short side direction of the substrate 3, as shown in FIG. 17B. The facing surface 20g of the target 2G facing the substrate 3 includes a bottom surface 200g parallel to the short side direction of the substrate 3, and inclined surfaces 201g, 202g that are inclined with respect to a direction parallel to the short side direction of the substrate 3, and an angle $\theta_1$ between the bottom surface 200g and the inclined surfaces 201g, 202g is an obtuse angle, as shown in FIG. 17C.

By using the targets 2E, 2F, and 2G, the intensity of the magnetic field inside the excitation coil 31 of the substrate 3 is made uniform in the portion facing the targets 2E, 2F, and 2G. As a result, the detection accuracy of the position by the induced voltage V1 induced in the sine waveform detection coil 32 and the induced voltage V2 induced in the cosine waveform detection coil 33 is improved. That is, since the targets 2E, 2F, and 2G have the facing surfaces 20e, 20f, and 20g facing the substrate 3, which are formed as recesses, the magnetic flux density reduction effect of reducing the density of the magnetic flux interlinking with the sine waveform detection coil 32 and the cosine waveform detection coil 33 due to eddy currents generated in the targets 2E, 2F, and 2G is lowered in the center portion in the short side direction of the substrate 3, and the strength of the magnetic field inside the excitation coil 31 of the substrate 3 is made uniform, resulting in a positional difference. Improves detection accuracy.

In FIGS. 17A to 17C, on the facing surfaces 20e, 20f, and 20g of the targets 2E, 2F, and 2G, $P_{21}$ indicates positions where they are aligned in the thickness direction of the substrate 3 with the center portions of the sine waveform detection coil 32 and the cosine waveform detection coil 33 in the short side direction of the substrate 3, and $P_{22}$ and $P_{23}$ indicate positions where they are aligned in the thickness direction of the substrate 3 with the pair of long side portions 31a, 31b of the excitation coil 31. A distance D1 between $P_{21}$ and $P_{22}$, $P_{23}$ in the thickness direction of the substrate 3 is, e.g., 1 mm.

Summary of Embodiments and Modifications

Next, technical ideas understood from the embodiments and modifications will be described with reference to the reference numerals and the like in the embodiments and modifications. However, each reference numeral in the following description does not limit the constituent elements in the scope of claims to the members and the like specifically shown in the embodiments and modifications.

According to the first feature, a position detection device such as a stroke sensor 1 for detecting a position of a shaft such as rack shaft 13, 13D moving forward and backward in an axial direction, includes a detection object such as target 2, 2A attached to the shaft 13, 13D, an excitation coil 31 for generating an alternating magnetic field, and a detection coil 32, 33/32A, 33A/32B, 33B/32C, 33C arranged along an axial direction of the shaft 13, 13D, and a magnitude of a voltage induced in the detection coil 32, 33/32A, 33A/32B, 33B/32C, 33C varies in accordance with a position of the detection object 2, 2A to 2G.

According to the second feature, in the position detection device 1 according to the first feature, the magnitude of the voltage induced in the detection coil 32, 33/32A, 33A/32B, 33B/32C, 33C varies in a range equal to or less than one cycle while the rack shaft 13, 13D moves from one movement end to an other movement end in the axial direction.

According to the fourth feature, in the position detection device 1 according to the first feature, the detection coil 32, 33/32A, 33A/32B, 33B/32C, 33C has a shape obtained by combining a pair of sinusoidal conductor wires being symmetrical across a symmetry axis A1 to A4 parallel to the axial direction of the rack shaft 13, 13D when viewed in a direction perpendicular to the axial direction of the rack shaft 13, 13D.

According to the fourth feature, in the position detection device 1 according to any one of the first to third features, the detection coil 32, 33/32A, 33A/32B, 33B/32C, 33C includes a plurality of detection coils, phases of voltages induced in the plurality of detection coils 32, 33/32A, 33A/32B, 33B/32C, 33C are different from each other while the rack shaft 13, 13D moves from one movement end to an other movement end in the axial direction.

According to the fifth feature, in the position detection device 1 according to the fourth feature, the excitation coil 31 and the plurality of detection coils 32, 33/32A, 33A/32B, 33B/32C, 33C are formed on one substrate 3, 3A, 3B, 3C.

According to the sixth feature, in the position detection device 1 according to the fifth feature, the substrate 3, 3A, 3C is a four-layer substrate on which first to fourth metal layers 301 to 304 are formed in order from a detection object 2, 2A to 2G side, the plurality of detection coils includes two detection coils 32, 33/32A, 33A/32C, 33C formed on the substrate 3, 3A, 3C, a part of one of the two detection coils 32/32A/32C is formed on each of the first metal layer 301 and the third metal layer 303 and a part of an other of the two detection coils 33/33A/33C is formed on each of the second metal layer 302 and the fourth metal layer 304.

According to the seventh feature, in the position detection device 1 according to the fifth feature, the excitation coil 31 is formed on the substrate 3, 3A, 3B, 3C so as to surround the plurality of detection coils 32, 33/32A, 33A/32B, 33B/32C, 33C.

According to the eighth feature, in the position detection device 1 according to the seventh feature, the substrate 3 has a rectangular shape, a longitudinal direction of the substrate 3 is the axial direction of the shaft 13, the excitation coil 31 includes a pair of long side portions 31a, 31b extending in a longitudinal direction of the substrate 3 and sandwiching the plurality of detection coils 32, 33 in a short side direction of the substrate 3, and a pair of short side portions 31c, 31d extending in the short side direction of the substrate 3 and sandwiching the plurality of detection coils 32, 33 in the longitudinal direction of the substrate 3, and, between each of the pair of short side portions 31c, 31d and the plurality of detection coils 32, 33, buffer regions $E_1$, $E_2$ are provided to suppress a voltage generated in the plurality of detection coils 32, 33 due to magnetic fields generated by current flowing through the pair of short side portions 31c, 31d.

According to the ninth feature, in the position detection device 1 according to the first feature, a length $L_3$ of the detection object 2, 2A to 2G in the axial direction of the shaft 13, 13D is half or less of a length $L_2$ of the detection coil 33/32A, 33A/32B, 33B/32C, 33C.

According to the tenth feature, in the position detection device 1 according to the first feature, the detection object 2, 2A to 2D is made of a material having a magnetic permeability equal to or higher than a magnetic permeability of the shaft 13, 13D.

According to the eleventh feature, in the position detection device 1 according to the first feature, the detection object 2, 2A to 2G is made of a material having a conductivity equal to or higher than a conductivity of the shaft 13, 13D.

According to the twelfth feature, in the position detection device 1 according to the tenth or eleventh feature, at least a part of the detection object 2D is embedded in a recess 130 formed at the shaft 13D.

According to the thirteenth feature, in the position detection device 1 according to the seventh feature, the substrate 3 has a rectangular shape, a longitudinal direction of the substrate 3 is the axial direction of the shaft 13, the excitation coil 31 includes a pair of long side portions 31a, 31b extending in a longitudinal direction of the substrate 3 and sandwiching the plurality of detection coils 32, 33 in a short side direction of the substrate 3, and a pair of short side portions 31c, 31d extending in the short side direction of the substrate 3 and sandwiching the plurality of detection coils 32, 33 in the longitudinal direction of the substrate 3, the detection object 2E, 2F, 2G is made of a material having a conductivity equal to or higher than a conductivity of the shaft 13, a facing surface 20e, 20f, 20g of the detection object 2E, 2F, 2G facing the substrate 3 is formed in a concave shape in such a manner that a distance from the facing surface 20e, 20f, 20g to the substrate 3 is the longest at the position aligned in the thickness direction of the substrate 3 with the center portions in the short side direction in the detection coils 32, 33.

According to the thirteenth feature, in the position detection device 1 according to the first feature, the shaft 13, 13D is a rack shaft of a vehicle steering device.

Although the embodiment and modifications of the present invention have been described above, the above embodiment and modifications do not limit the invention according to the scope of claims. Also, it should be noted that not all combinations of features described in the embodiment and modifications are essential to the means for solving the problems of the invention.

The present invention can be appropriately modified and implemented without departing from the gist thereof. For example, in the above embodiment, although the case where the object of position detection by the stroke sensor 1 is the rack shaft 13 of the steering device 10 has been described, the present invention can also be applied to the detection of a shaft which moves in a forward and backward direction in the axial direction other than the rack shaft 13. Moreover, a part of the targets 2E, 2F, and 2G according to the fifth modified example may be embedded in the rack shaft as in the fourth modified example.

The invention claimed is:

1. A position detection device for detecting a position of a shaft moving forward and backward in an axial direction, comprises:
   a detection object attached to the shaft;
   an excitation coil for generating an alternating magnetic field; and
   a detection coil arranged along an axial direction of the shaft,
   wherein a magnitude of a voltage induced in the detection coil varies in accordance with a position of the detection object.

2. The position detection device according to claim 1, wherein the magnitude of the voltage induced in the detection coil varies in a range equal to or less than one cycle while the shaft moves from one movement end to an other movement end in the axial direction.

3. The position detection device according to claim 1, wherein the detection coil comprises a shape obtained by combining a pair of sinusoidal conductor wires being symmetrical across a symmetry axis parallel to the axial direction of the shaft when viewed in a direction perpendicular to the axial direction of the shaft.

4. The position detection device according to claim 1, wherein the detection coil is composed of a plurality of detection coils, wherein phases of voltages induced in the plurality of detection coils are different from each other while the shaft moves from one movement end to an other movement end in the axial direction.

5. The position detection device according to claim 4, wherein the excitation coil and the plurality of detection coils are formed on one substrate.

6. The position detection device according to claim 5, wherein the substrate is a four-layer substrate on which first to fourth metal layers are formed in order from a detection object-side, wherein the plurality of detection coils includes first and second detection coils formed on the substrate, wherein a part of the first detection coil is formed on each of the first metal layer and the third metal layer and a part of the second detection coil is formed on each of the second metal layer and the fourth metal layer.

7. The position detection device according to claim 5, wherein the excitation coil is formed on the substrate so as to surround the plurality of detection coils.

8. The position detection device according to claim 7, wherein the substrate has a rectangular shape and a longitudinal direction of the substrate is the axial direction of the shaft,
   wherein the excitation coil includes a pair of long side portions extending in a longitudinal direction of the substrate and sandwiching the plurality of detection coils in a short side direction of the substrate, and a pair of short side portions extending in the short side direction of the substrate and sandwiching the plurality of detection coils in the longitudinal direction of the substrate, and
   wherein, between each of the pair of short side portions and the plurality of detection coils, buffer regions are provided to suppress a voltage generated in the plurality of detection coils due to magnetic fields generated by current flowing through the pair of short side portions.

9. The position detection device according to claim 1, wherein a length of the detection object in the axial direction of the shaft is half or less of a length of the detection coil.

10. The position detection device according to claim 1, wherein the detection object is made of a material having a magnetic permeability equal to or higher than a magnetic permeability of the shaft.

11. The position detection device according to claim 1, wherein the detection object is made of a material having a conductivity equal to or higher than a conductivity of the shaft.

12. The position detection device according to claim 10, wherein at least a part of the detection object is embedded in a recess formed at the shaft.

13. The position detection device according to claim 7, wherein the substrate has a rectangular shape and a longitudinal direction of the substrate is the axial direction of the shaft,
   wherein the excitation coil includes a pair of long side portions extending in a longitudinal direction of the substrate and sandwiching the plurality of detection coils in a short side direction of the substrate, and a pair of short side portions extending in the short side direction of the substrate and sandwiching the plurality of detection coils in the longitudinal direction of the substrate,
   wherein the detection object is made of a material having a conductivity equal to or higher than a conductivity of the shaft, and
   wherein a facing surface of the detection object facing the substrate is formed in a concave shape in such a manner that a distance from the facing surface to the substrate is the longest at a position aligned in the thickness direction of the substrate with the center portion in the short side direction of the detection coil.

14. The position detection device according to claim 1, wherein the shaft is a rack shaft of a vehicle steering device.

* * * * *